United States Patent Office.

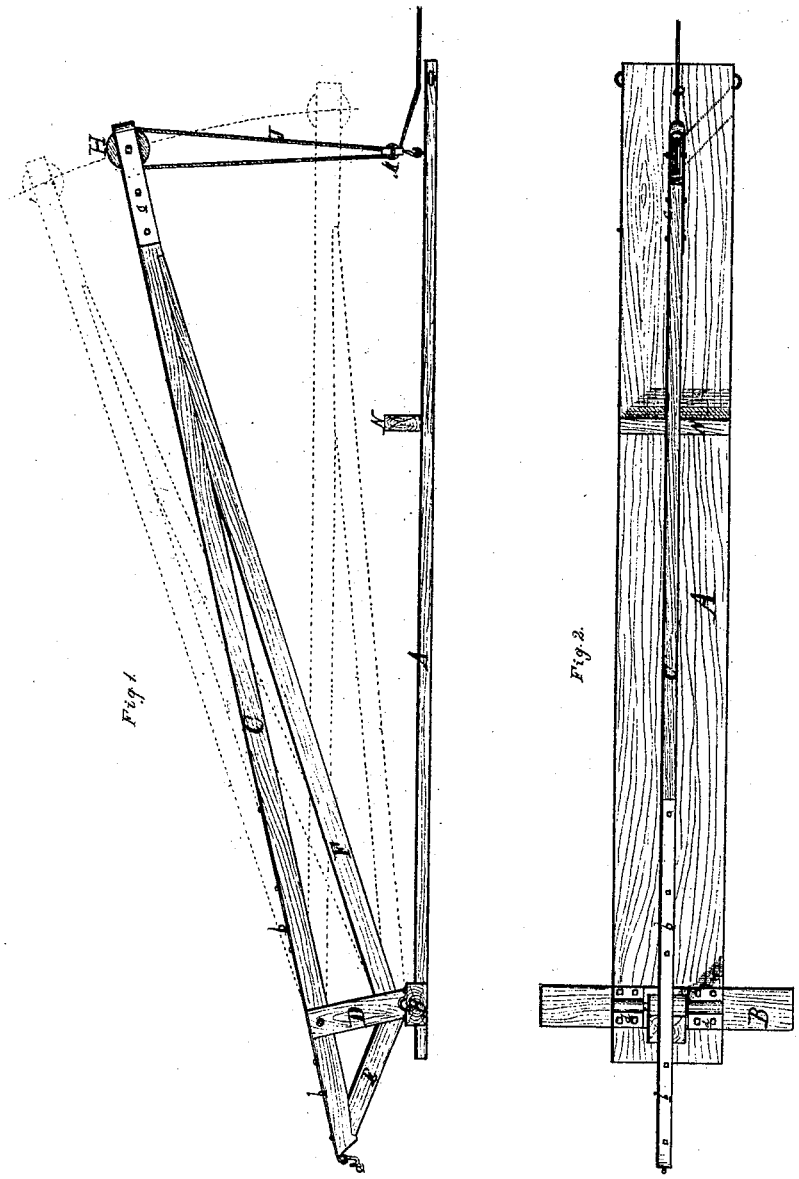

JOSEPH G. FOX, OF OREGON, WISCONSIN.

Letters Patent No. 99,179, dated January 25, 1870.

LEVER AND STUMP-PULLER.

The Schedule referred to in these Letters Patent and making part of the same.

*To all whom it may concern:*

Be it known that I, JOSEPH G. FOX, of Oregon, in the county of Dane, and State of Wisconsin, have invented a new and useful lever and lifting-machine, which I designate as "Fox's Practical Lever and Stump-Puller," designed to afford a cheap and powerful means of extracting stumps and small trees, and of raising and removing heavy stones from the earth and other like uses; and I do hereby declare that the following is a full and exact description thereof, reference being had to the accompanying drawing, and to the letters of reference thereon, which will readily enable others skilled in the mechanic arts to make and use the same.

Figure 1 represents a lateral view, with the lever partly elevated.

Figure 2 represents a view from the top, with the lever resting on the bed-piece.

Like lettering of the parts in both figures.

I construct the machine as follows:

I take first a plank bed-piece, A, which is at least as long as the upper bar of the lever, and is two inches thick, at least eighteen inches wide, and for the general uses above indicated, should be sixteen feet in length.

Near one end, I put on the cross-piece, B, which is of hard wood, not less than four feet long, eight inches wide, and four inches thick, and into a gain on the under surface of this cross-piece I fix the plank bed-piece, so that the under surfaces of the two are even, and they are fastened together by the bolts which hold the journal-caps.

I then construct the lever, all of hard wood, as follows:

First, I make the top bar, C, of a scantling, four by four inches, or four by five inches in size, and generally sixteen feet in length.

Second, this is supported by the fulcrum D, made of a piece, four by eight inches in size, not less than eighteen inches long, which is placed at a distance from the lifting-hook a, of one-eighth the length of the top-bar C, and receives the top bar by a gain on the upper end, secured by a bolt. The fulcrum is rounded off at the lower end, and has a gain to receive the journal or gudgeon G, which will be hereinafter described.

Third, I then add the braces E and F, seen in fig. 1, which are of equal size with the top bar C, and which are each connected with the top bar and fulcrum at each end by a tenant and shoulder, as seen in fig 1, and which, with the fulcrum, constitute the great strength of the lever.

On the top bar C, I place a heavy bar of iron, *b b*, not less in length than one-third the top bar, and secured by bolts through it, which terminates at the lifting-end in a forged eye, and into this eye is forged the heavy iron lifting-hook a, which is thus made secure.

At the opposite end of the top bar I cut a gain, into which is placed the pulley H, which is secured by means of a heavy iron strap, c, passing on both sides the top bar, and bolted through it. This constitutes the lever proper.

The lever is then connected at the foot of the fulcrum D with the bed-plank, in the following manner, viz:

A bed-plate, of iron, not clearly shown in the drawing, as wide as the cross-piece B, and slightly concave, is laid on the cross-piece B, on which rests the foot of the fulcrum. The journal or gudgeon is made flat in the middle, where it is received in the gain, at the foot of the fulcrum D, and round at each end, and the journal is secured by two staples, not visible in the drawings, which are driven up from underneath around the journal, into the foot of the fulcrum.

The round ends of the journal are held down by the caps *d d*, seen in fig. 2, and these are secured, each by four bolts, which pass through the caps, the bed-plate, the cross-piece B, and the bed-plank, fastening the whole securely together.

The lower pulley, M, the wheel of which should not exceed two inches in diameter, is encased with a wrought-iron strap, with a swivel-hook at the bottom, to catch in the wrought-iron staple on the bed-plank, and an eye on the top, in which to fasten the end of the rope J.

The rope is secured at the top of the pulley M, passes round the outer side of the pulley H, and back through the pulley M, and thence is attached to the team or other power employed.

At the rear end of the bed-plank A is a small plate, terminating, at each side of the bed-plank, in an eye, to receive the hook of a stake designed to hold in place the end of the bed-plank, a very slight force being sufficient to hold it down, if desired.

N represents a block, fixed to the bed-plank, to prevent the lever crushing the pulleys.

This machine is operated in the following manner, viz:

A chain is fastened around the stump, stone, or other object to be lifted or pulled, and dropped into the lifting-hook, the lever being raised so as to bring the lifting-hook to the level of the bed-piece, which is placed at the lifting-end, with reference to the object to be raised or pulled. The horses are then driven forward, which raises the stump or other object from the earth, and then, if desired, may be driven further forward, drawing the object raised, or the object may be set to one side by driving the team sideways in the opposite direction.

Practical experiments have demonstrated that an immense resistance may be overcome with a comparatively slight power, by means of this combination.

What I claim as my invention, and desire to secure by Letters Patent, is—

1. The combination of the lever and tackle-powers with the platform or bed-piece, in the manner above described.

2. The mode of constructing the lever proper, with the top-bar, fulcrum, and braces, in the manner described.

JOSEPH G. FOX.

Witnesses:
 HENRY VILAS,
 CHAS. E. VROMAN.